W. O. LAMBERT AND G. H. POUND.
FIBER EXTRACTING MACHINE.
APPLICATION FILED MAR. 18, 1920.
1,389,883.
Patented Sept. 6, 1921.
4 SHEETS—SHEET 4.
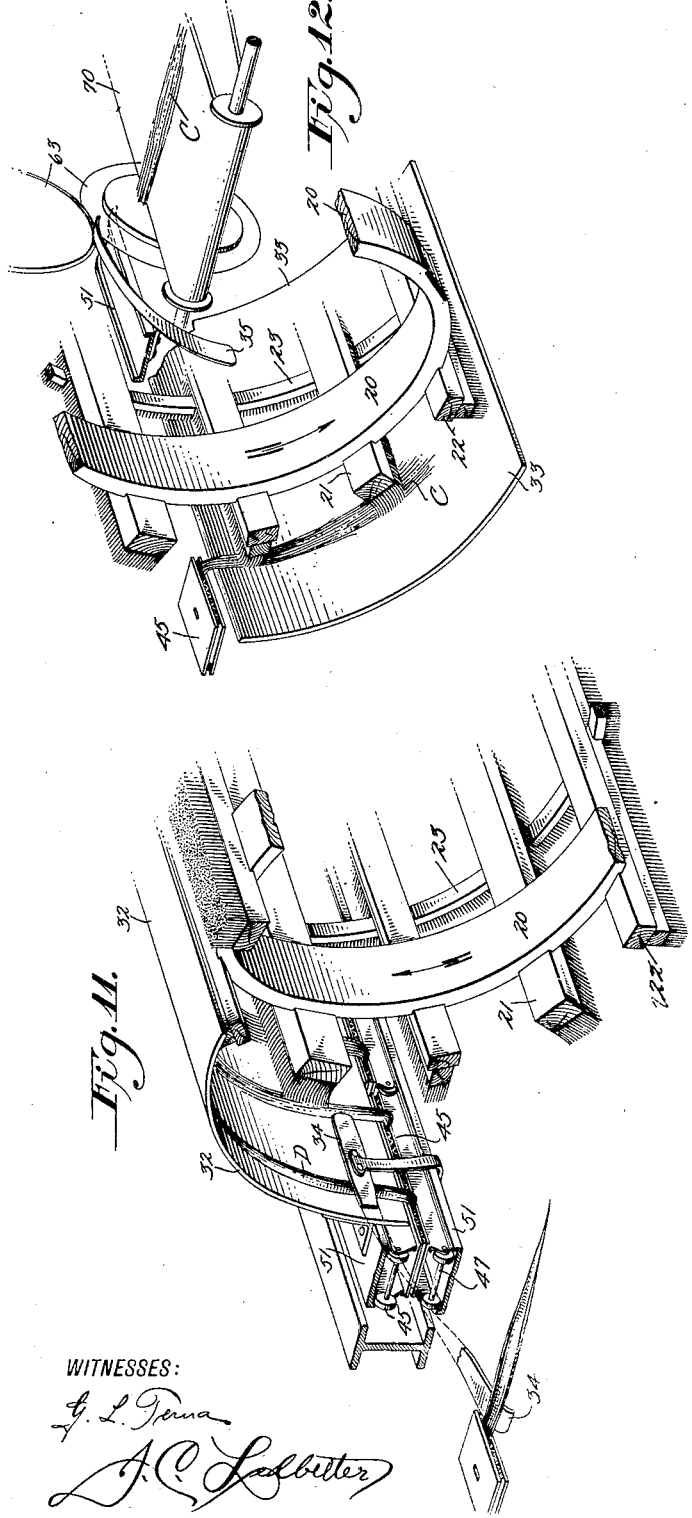
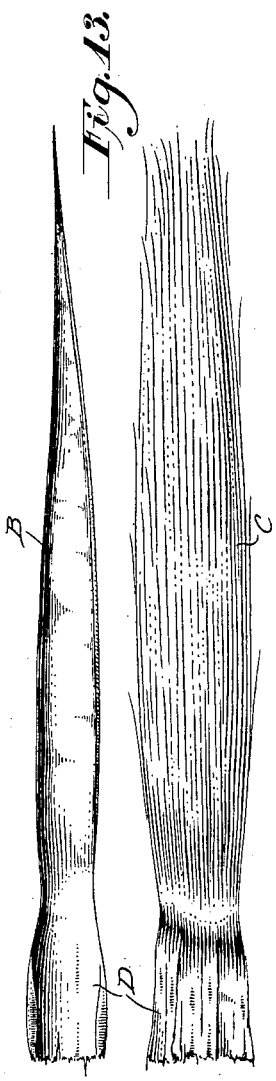
WITNESSES:
INVENTORS
W. O. LAMBERT,
G. H. POUND.
BY
ATTORNEYS

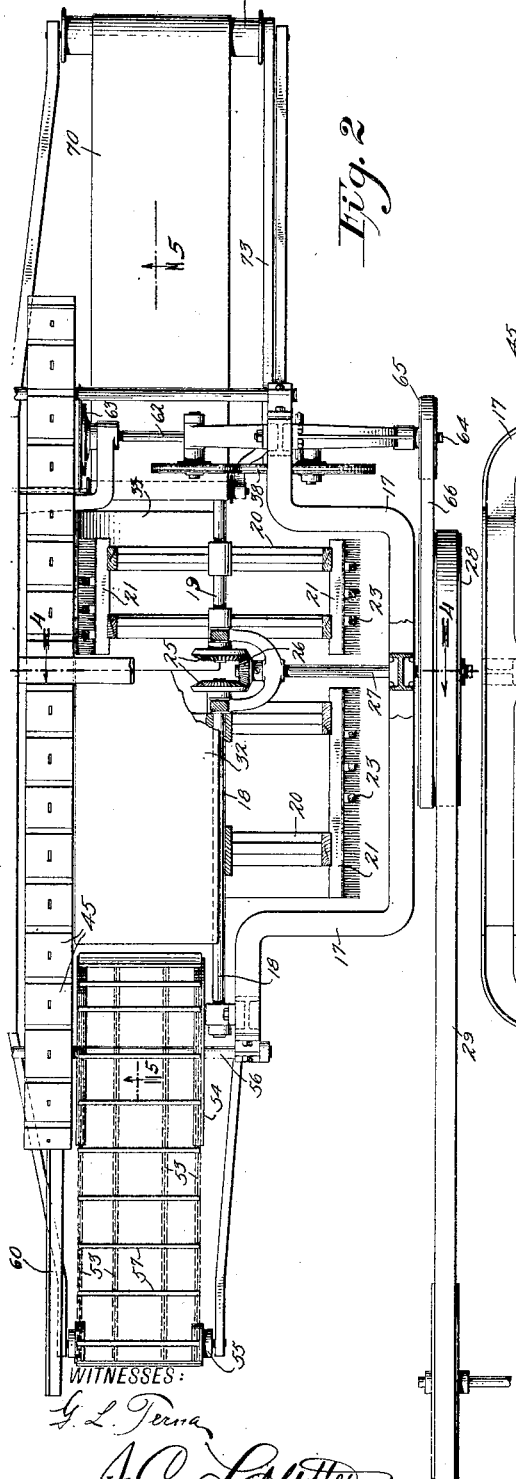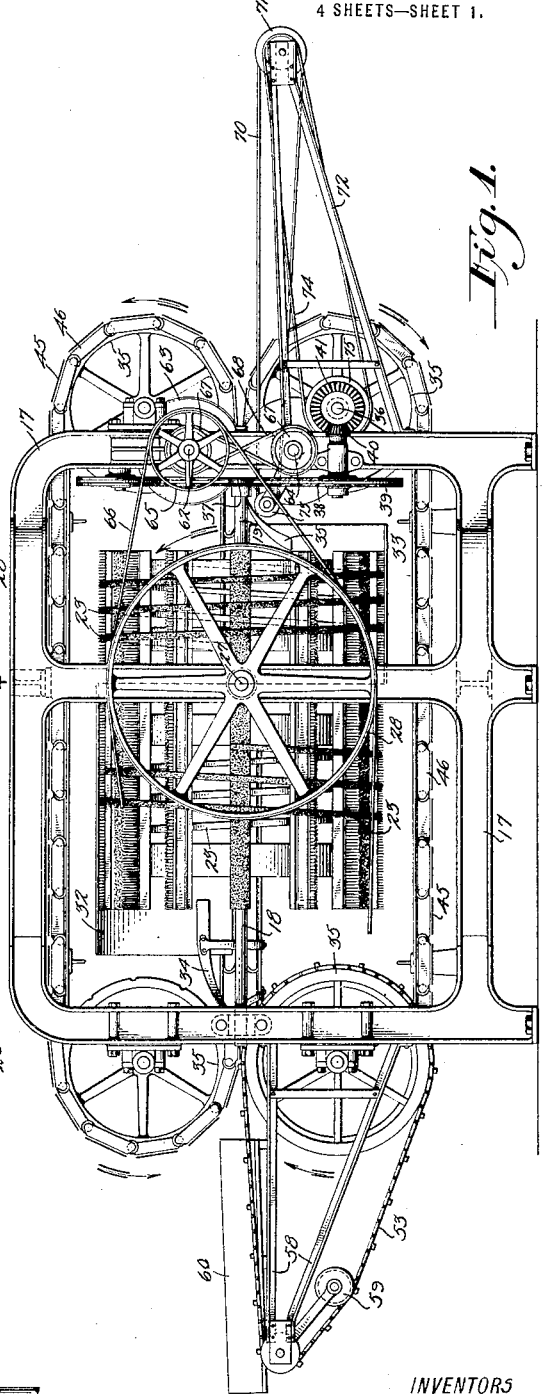

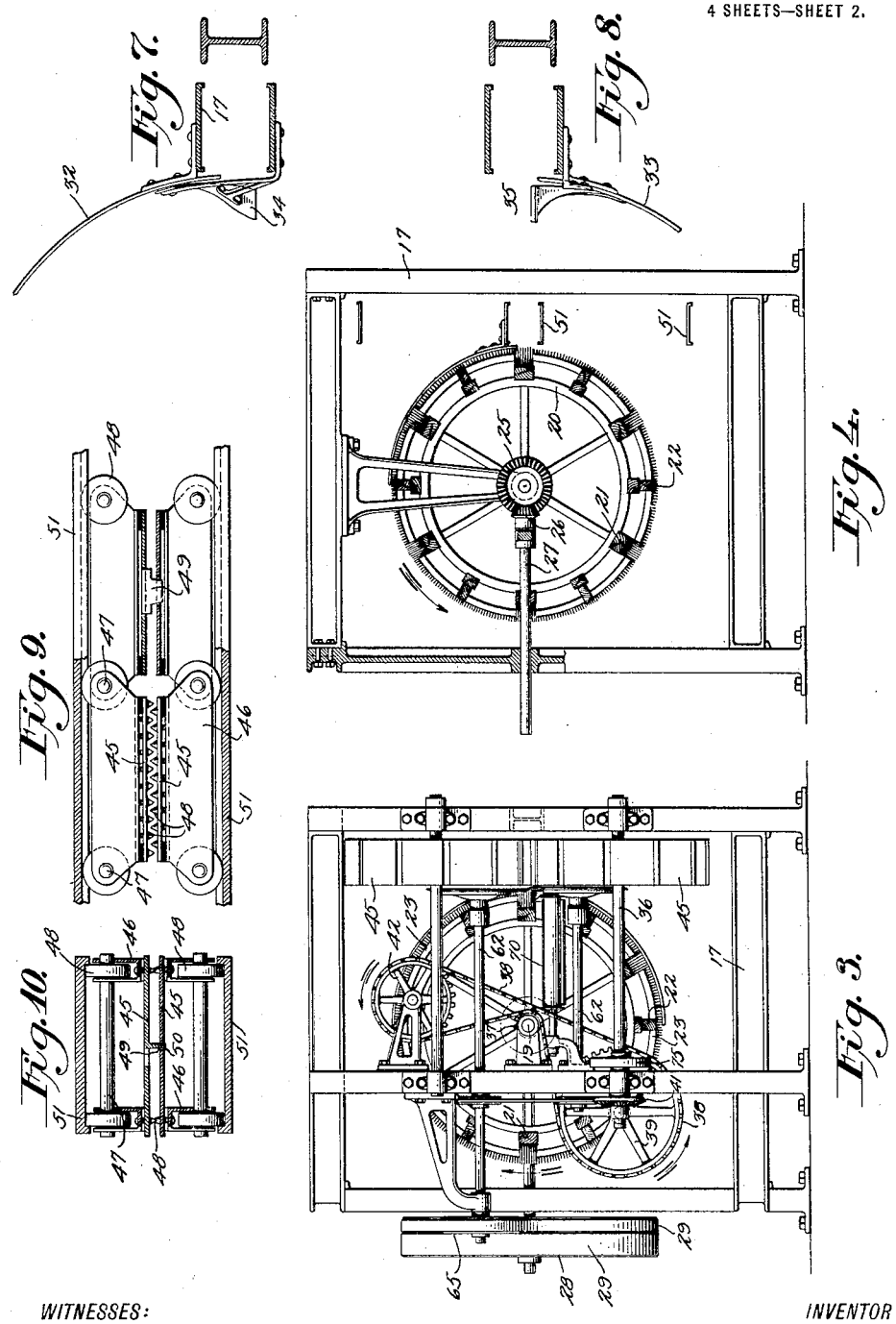

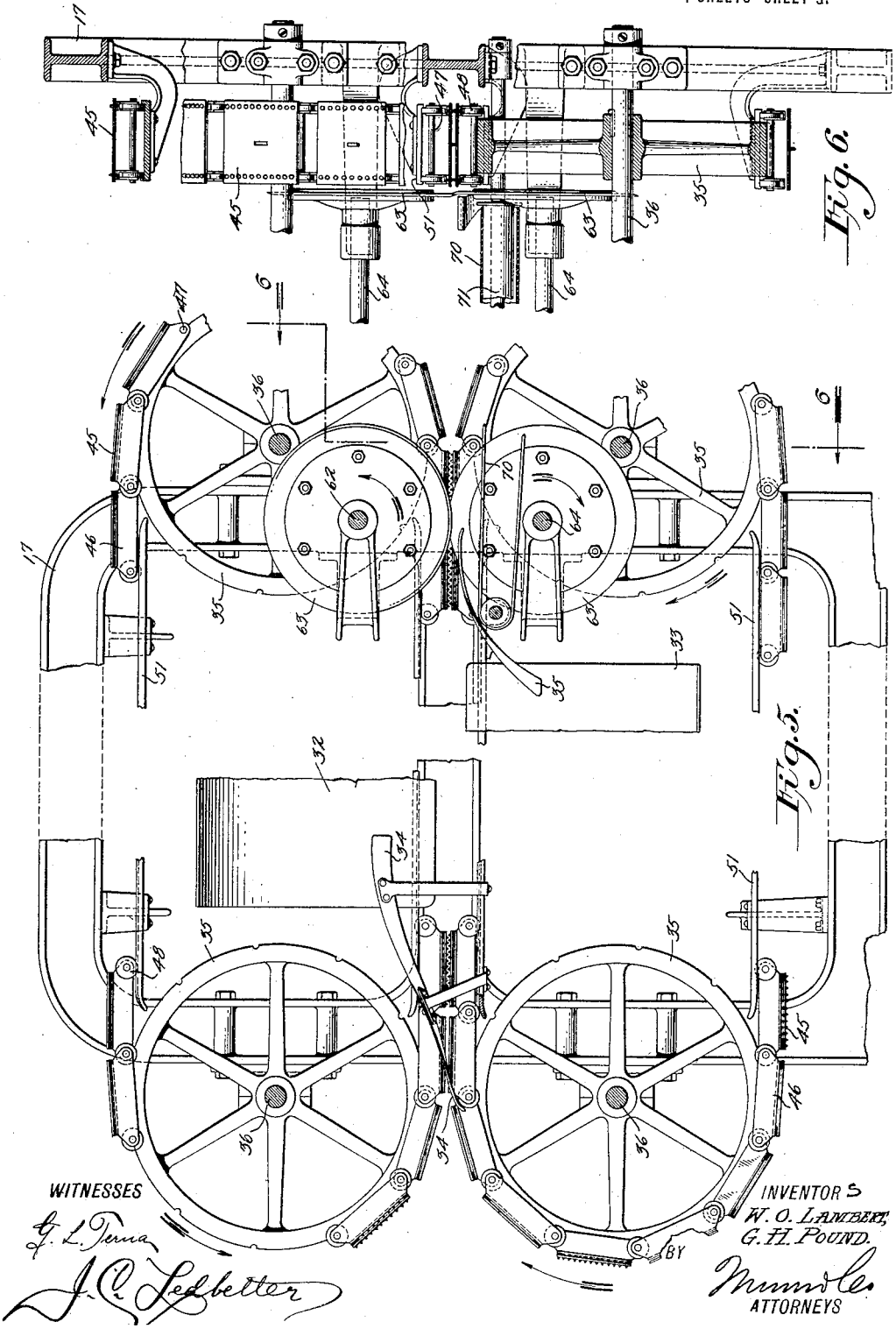

UNITED STATES PATENT OFFICE.

WILLIAM OREN LAMBERT AND GEORGE HERBERT POUND, OF EL PASO, TEXAS.

FIBER-EXTRACTING MACHINE.

1,389,883.   Specification of Letters Patent.   Patented Sept. 6, 1921.

Application filed March 18, 1920. Serial No. 366,742.

*To all whom it may concern:*

Be it known that we, WILLIAM O. LAMBERT and GEORGE H. POUND, citizens of the United States, and residents of El Paso, in the county of El Paso and State of Texas, have invented a new and Improved Fiber-Extracting Machine, of which the following is a full, clear, and exact description.

This invention relates to fiber-extracting machines, and more particularly relates to improvements in that class of machines employed in connection with the separation of fiber from vegetable matter and leaves.

It is well known that there are varieties of plants growing leaves which contain a threadlike filament or fiber having an industrial value in the manufacture of rope and cordage. One of the well-known species of plants indigenous to the southwestern portion of the United States and in tropical parts of America is known as "agave." The agave and similar plants yield a long and strong fibrous and threadlike filament having pronounced and inherent tensional strength, which is used for the manufacture of rope and other products.

We have in view the production of a machine for extracting fiber from the aforesaid plants, and such a machine built in accordance with the plan of our invention is intended to remove the fleshy and spongy vegetable matter from the fiber, leaving the fiber in whole-length and undamaged form; and has in view the treatment of the leaves on a quantity basis, which renders economical the extraction of the fiber from the leaves to the end that the industry may be greatly benefited and fiber produced on a larger scale for the manufacture of rope, fiber mats, cordage, and other articles of commerce made of vegetable fiber.

One of the primary objects of our invention is to produce a fiber-extracting machine which will adequately treat both sides of the agave leaf, or other plants, to insure the positive removal of all pulpy matter from the fiber to the end that the fiber will be thoroughly cleansed and in marketable condition at the time it passes through the machine.

It is a further object of our invention to produce a fiber-extracting machine having a feeding mechanism and a shredding mechanism operating in synchronism to execute a positive and continuous cutting and shredding engagement of the machine against the plant leaves being treated; and further, to provide extracting mechanism which closely simulates or approximates a manually operated, or a hand operated, shredding brush.

It is an object to provide novel and effective feeding mechanism to the end that the plant leaf will be securely held during the shredding and cutting operation of the plant leaves; and, further, to provide guides which bend the leaves into position to be acted on by the shredding and extracting mechanism.

Briefly, it may be stated that a machine constructed in accordance with the plan of our invention involves the use of a pair of oppositely revolving shredders and brushes for the purpose of doing execution against both sides of the leaves, first one side of the leaf being treated, followed by a treatment on the reverse side of the leaf. A pair of coöperating feed chains with jaws act to positively move the leaves through the machine in order that first one shredding wheel may act upon the leaf, and then the other shredding wheel acts upon the leaf. The shredding wheel is provided with a helical shredding element, which has a predetermined pitch or lead, operating in synchronism with the feed chain in order that the shredder may continuously act on the leaf to effectively cut and loosen the fleshy matter from the fibers. Brushes are employed to sweep and clean the fleshy matter from the cut and shredded leaves to leave the clean, threadlike, fibrous product ready for baling preparatory to marketing. The machine embodies a radial resistance plate and coöperating guide for facilitating the feeding of the leaves to the several shredding and brushing wheels. Other features of construction and operation appear in the specification where the detail description has reference to the accompanying drawings.

Having the above principal objects and others in view, and in conformity with the invention as mentioned in the preceding paragraph, our invention has relation to the combination and arrangement of simplified parts as set forth in the appended claims defining the invention, and as further related to the fiber-extracting machine, one particular form of which is described in the following paper, and portrayed in the drawings, wherein—

Figures 1 and 2 respectively illustrate a side elevation and plan view of the fiber-extracting machine which is built in accordance with the principles of this invention.

Fig. 3 illustrates an end elevation of the machine; and Fig. 4 illustrates a transverse sectional view taken on the line 4—4 of Fig. 2.

Fig. 5 illustrates an enlarged fragmentary view, and more particularly a view as developed on the line 5—5 of Fig. 2. The Fig. 6 illustrates an end elevation of the Fig. 5, and more particularly a view as developed on the line 6—6 of Fig. 5. The shredding and brushing elements are removed from these two views.

Fig. 7 illustrates a detailed fragmentary view of a coöperating resistance plate and leaf guide employed in the machine for delivering and holding one side of the leaf in engagement with the shredding wheel; while Fig. 8 illustrates similar parts used for delivering and holding the other side of the leaf in engagement with the shredding wheel.

Fig. 9 shows a portion of a feed chain employed to grip and deliver the plant leaves to the shredding wheels, parts thereof being broken away; and Fig. 10 is a cross-sectional view taken through the feed chain, or taken through Fig. 9.

Fig. 11 illustrates a perspective view of one shredding and brushing wheel operating in connection with a resistance plate to shred and remove the pulp from the fibrous product of the plant leaf, and Fig. 12 shows a similar view of a combination shredding and brushing wheel acting on a leaf; the two views being diagrammed in perspective alinement to show how first one side of the leaf is treated and then the other side of said leaf.

Finally, there is shown a natural uncut agave century plant, or other similar fiber-producing leaf B, in its natural form as gathered from the plant prior to being treated by this machine; and, further, there is shown the treated agave leaf having removed therefrom all the fleshy, pulplike matter to leave a mass of long filamentous and thread-like fibers C. The leaf B has a butt end D which is held in the jaws of the feed chain while the fleshy matter is removed to leave the fibers C, all as shown in Fig. 13.

In presenting a more detailed description of our machine, there are shown the fiber-extracting machine parts assembled on and in a suitable frame 17. Shafts 18 and 19 are journaled in the frame. A shredding and brushing wheel is carried on each shaft. These wheels run in opposite directions. Each shredding wheel has suitable spokes and carries a rim 20. A plurality of brushes 21 are equidistantly spaced one from the other and secured to the rim 20, being arranged parallel to the axis of the drum. Brushes, which may be arranged in alternate sets of fibrous and steel bristles 21 and 22, are applied to the shredding wheels. The steel brushes 22 cut and shred, while the fibrous brushes 21 sweep the pulp from the leaf, as later seen. It is, of course, practical to dispense with the use of the fibrous brushes, and use only steel brushes, since they are more positive in their cleaning operation. The cutting and shredding wheel has a helical shredder 23 which leads around the shredding wheel a number of turns, and has an appropriate lead or pitch in order to follow and do effective execution against the leaf. It is preferable to slightly reduce the diameter of the front end of the shredding wheel to facilitate the ingress of the leaves to the shredding pins, and to reduce the power required to run the machine.

A companion shredding wheel is carried on the shaft 19 and constructed similarly to the shredding wheel described in the preceding paragraph. This wheel likewise has alternate fiber-bristle brushes 21 and steel brushes 22. The shredding wheel is also provided with the helical shredding element 23, as above described. It is pointed out that this shredding wheel carried on the shaft 19 has a shorter working face than the first-described shredding wheel as mounted on the shaft 18, but the invention is not limited to this principle. It is practical to construct the second-named shredding wheel shorter, since it is required to do less work than the first-named wheel, as the plant leaves are vigorously treated by the first-named wheel, and followed by a shredding treatment by the wheel 19 on the reverse side of the leaf; the first shredding operation removes the greater portion of the vegetable pulp, leaving comparatively a small portion to be removed by the last-described wheel.

Bevel gears 25 are fixed on each adjacent end of the shafts 18 and 19. A drive pinion 26 is fixed to a drive shaft 27, and meshes with the bevel gears 25 to oppositely run the two shredding wheels which are fixed on the driven shafts 18 and 19. A main drive pulley 28 is fixed to the shaft 27 and receives power from a belt 29 to operate the entire mechanism of the fiber-extracting machine.

There are provided resistance plates 32 and 33 respectively coöperating with the first shredding wheel 18 and the second shredding wheel 19. The resistance plates are formed on an arc concentric with the shredding wheels and closely arranged in spaced relation from the brushes 21 and 22 of each shredding wheel. The resistance plates are employed to back up and forcibly hold the leaves in position during the shredding operation of the machine. The two plates are arranged in opposite relation one to the other, as well shown in Figs. 11 and 12, where one of the plates is placed around the lower portion of the second shredding wheel, while the other resistance plate is mounted concentrically with the upper part of its respective shredding wheel. This arrangement permits the alternate sides of the leaves to be held against the shredder in the consecutive operations of the machine, as will be more fully seen when a detailed description of the operation is given. Each resistance plate is preferably somewhat longer than its respective shredding wheel in order that the brushes may lie within the confines of the plates. A leaf guide 34 is supported on a bracket adjacent the resistance plate 32, and a similar guide 35 is related with the resistance plate 33. These two guides are more clearly shown in Figs. 11 and 12. The guide 34 has its inner end closely spaced from the resistance plate 32 and projects inwardly quite closely to the path swept by the brushes. The outer end of this leaf guide 34 is twisted and bent downwardly to conform to the horizontal position assumed by the leaves prior to their entrance into the machine. The other leaf guide 35 has its inner end curved concentrically with the resistance plate 33 and lying in close proximity to the line of brush operation. The outer end of the leaf guide is turned up and twisted in a horizontal position to deliver the leaves to a rotating shear, as later seen.

A chain feed mechanism is supplied to deliver the leaves into position between the resistance plates and the shredding wheels. This mechanism comprises a pair of separate endless chains carried on wheels 35$^a$ fixed on shafts 36 journaled in the frame of the machine. In describing a driving means for the wheels 35, reference is had to Figs. 1, 2 and 3, wherein there is shown a sprocket 37 fixed on the end of the shaft 19; and a drive chain 38 engages this sprocket. The chain 38 is confined on a driven sprocket 39 which is fixed on a shaft carrying a pinion 40. The chain 38, therefore, drives the pinion 40 which in turn drives a bevel gear 41 fixed on the aforesaid shaft 36. There is an idle sprocket 42 which carries the upper portion of the chain 38 in order that the drive sprocket 37 may engage the outer side of the chain 38 to subject the shaft 36 and wheel 35$^a$ to rotation in the proper direction. The arrows in the figures, applied adjacent the wheels 35$^a$, indicate the direction of rotation of these parts.

The chain feed above referred to consists of two endless chains confined on the upper and lower set of wheels 35$^a$ which brings together in coacting relation the adjacent horizontal sections of the chains to form jaws to grip the butt ends of the leaves. The chain mechanism more particularly comprises a plurality of jaw plates 45 carried on chain links 46. The chain links are preferably constructed of channel material and linked together by pins 47. Each pin 47 is, in fact, an axle or pintle carrying a roller 48 on each end thereof and preferably within the channel link sections 46. Each complete link comprises a jaw plate 45 fixed to a pair of spaced channel sections 46 with the connecting pintles 47 having rollers, said pintles being employed to connect each succeeding link. The channel sections 46 are usually fixed to the jaw plates 45 by employing a rivet which projects through the jaw plate and terminates on the outer face thereof in the form of a sharpened tooth 44. It is desirable to employ a plurality of teeth 44 on each chain section arranged in staggered relation so that the teeth register or fit within each other to form effective jaws to hold the butt ends of the leaves. It is pointed out that one of the endless chains runs idle, or is, in fact, driven by virtue of its engagement with the other endless chain acting as a driver. A punched or struck-up ear 49 is formed on the jaw plates 45 of one chain section, while a hole 50 is punched in the adjacent jaw section to register with the ear 49. This forms a positive engagement between the upper and lower endless chains. As the upper and lower endless-chain sections come into engagement for the adjacent horizontal travel through the machine, each ear 49 passes into engagement with the hole 50 and, thus, acts to draw the idle chain along with the driven chain carried on the lower set of wheels 35$^a$ driven by the chain 38 through the shaft 36. Tracks 51 are held in the frame of the machine in order to guide the chain sections into adjacent registry. The tracks 51, in fact, may be made of channel material in order to have up-standing ribs on each side to guide and hold the chain in horizontal and positive registry. The rollers 48 of the feed chain roll along in the channel track 51. A section of the track 51 may also be employed to support the outermost or disengaged sections of the feed chain, as shown in the upper and lower portions of the Fig. 5.

A carrier is employed for the purpose of delivering the leaves to the chain feed mechanism. The carrier comprises a number of parallel endless chains 53 carried around a driving sprocket 54 and over an idle sprocket or suitable roller 55. The sprockets 54 supporting the carrier 53 are carried on the shaft 56 which also carries one of the chain feed sprockets 35ᵃ. The shaft 36 serves to drive the upper portion of the carrier toward the chain feed mechanism. The carrier chains have a plurality of parallel, spaced slats 57, which are spaced to receive a single leaf placed adjacent each slat by the operator in order that the carrier 53 may deliver the leaves in appropriately spaced relation to the chain feed mechanism, and; further, in order that the leaves may be correctly spaced apart in said chain-feed mechanism. The carrier 53 is supported by a frame 58, and it is practical to employ an idler pulley or sprocket 59 to keep the carrier taut during operation. The sprocket 54 carrying the chain 53 is about equal in diameter to the diameter on which the chain-feed mechanism turns, therefore the carrier 53 and chain-feed mechanism 48 move in even relation, or parallel alinement, in order that the carrier may deliver the butt ends of the leaves overhanging the carrier and moving into engagement with the feed chain. A guideboard 60 is mounted parallel and in line with the carrier in order that the operator may speedily place the leaves in position on the carrier 53. The guideboard serves as a stop against which the operator may place the butt ends of the leaves as he lays them in position adjacent each slat 57 with the butt ends of the leaves overhanging the carrier and guided by the board as the leaves move forward toward the feed chain.

A set of rotary shears are employed to cut the butt ends from the leaves after the shredding and cleaning of the fleshy vegetable matter and pulp has been effected by the several shredding wheels. The rotary cutter or shears shown in the drawings comprises a pair of oppositely-driven disks or wheels having sharpened and overlapping peripheries, as shown in Fig. 12. It is obvious that the shears may be driven in either direction. The line on which the butt ends of the leaves travel through the machine is about tangent to the engaged peripheries of the rotary shears; that is to say, the rotary shears are placed in line with the feed chain in order that the leaves may pass through the shears while gripped by the feed chain to cut the cleaned fiber from the held butt end. It is seen that the outer end of the leaf guide 35 is shaped to deliver the fibered leaf directly into the rotary shears, holding such fibers in horizontal position while the shears perform execution. After the fibers are cut from the butt ends, the feed chain moves forward and disposes of the butt end of the leaf, while the fibers are deposited on a conveyer, as later seen. The shears are mounted on shafts 62 and 64. The shaft 62 projects outwardly from the frame of the machine and is fitted with a pulley 65. A belt 66 is passed around the pulley 65 and around the drive pulley 28 to rotate one of the shear disks 63. Pulleys 67 are fixed on the shafts 62 and 64, and a belt 68 is crossed over the two pulleys 67. This arrangement transmits a reverse rotary motion from the shaft 62 to the shaft 64, thus rotating the two shears 63 in opposite directions to effect positive cutting action of the fibers from the butt ends of the leaves.

A conveyer is supplied to receive the cleaned and cut fibers from the machine and transmit them to a point of disposal. This conveyer consists of a belt 70 carried over a pulley 71 mounted on the outer end of a frame 72, and over a pulley 73 supported on the interior of the frame. The upper carrying half of the belt is preferably spaced a little below the engaging line of the shears 63 in order that the clipped fibers may drop directly on the belt. The inner end of the belt extends well back of the line of contact of the shears and under the leaf guide 35 in order that every cut fiber will deposit on the outwardly moving conveyer 70. The conveyer is driven through the agency of a belt 74 arranged to drive the roller 71 from a pulley 75 fixed to the driven shaft 36.

With further reference to the functioning of the leaf guides in cooperative relation with the resistance plates, reference is had to the Figs. 7 and 8. The arcuate resistance plate 32 is shown secured to the frame 17 and the leaf guide 34 is also shown secured to the frame with the inner end of the leaf guide shaped concentric with the resistance plate and closely spaced therefrom. The same arrangement is made for the second leaf guide 35 placed at the rear of the machine to receive the cleaned fibers and deliver them in horizontal position to the cutter 63.

Having described the construction and assembly of the machine, it is now in order to give a complete disclosure of the operation and functioning of all parts.

An operator may stand adjacent the conveyer 53 and lay the leaves in position adjacent each slat 57. The butt ends of the leaves are allowed to project from the carrier and are guided in movement toward the feed chain 48. The butt ends D of the leaf are drawn into the feed chain, and as the projecting bodies B of the leaves move forward, the leaf guide 34 engages the leaf and gradually bends it upward until it lies in position against the interior arcuate face of the resistance plate 32. As the feed chain moves along the leaf D is engaged by the brushes 21 and 22. The steel bristle brushes 22 first act upon leaf to begin stripping off the outer skin of the leaf, while the brushes 21 keep the stripped and loosened vegetable matter cleaned from the leaf. The pitch or lead of the helical shredder is subjected to a peripheral movement equal to, or in some instances a little faster than, the linear rate of travel of the feed chain in order that the shredder may keep up with, or slightly over travel, the movement of the leaf along the inner face of the resistance plates. The leaf is soon engaged by the helical shredder 23 which thrusts its sharp steel pins into the body B of the leaf. The leaf is carried forward by the feed chain at about the same rate as the revolving helical shredder progresses by virtue of the pitch or lead of said shredder 23. The several turns of the shredder, therefore, act on the leaf throughout its travel along the face of the resistance plate. The steel brushes and fiber bristle brushes serve to adequately remove and clean the fleshy pulp from the leaf as the shredder performs the cutting execution directly against the body of the leaf.

By the time the feed chain has carried the leaf beyond the helical shredder, the leaf is pretty well cleaned of fleshy pulp, exposing the threads and fibers to view on the treated side of the leaf. It only remains to subject the reverse side of the leaf to a short shredding and brushing action in order to effectively remove the small remaining amount of undesirable vegetable matter in order to effect the complete removal of the pulp from the fibers. The leaf is now more flexible and easily drops down when released from the brushes of the first shredding wheel. As the leaf moves forward, the second shredding wheel 18, which is revolved in the opposite direction to that of the first shredding wheel, immediately lays hold on the leaf and subjects it to the identical treatment received by the first wheel. The alternate fiber bristles and steel bristles of the two sets of brushes sweep and clean the leaf while the helical shredder 23 cuts into the opposite side of the leaf, shredding and cutting the remaining traces of fleshy pulp from the leaf. By the time the leaf has progressed to the end of the resistance plate 33, there remains only the bunched or thoroughly cleaned vegetable fibers. The vegetable fibers have been extracted from the leaf and saved as carefully as if the entire operation had been carried out by manually-operated shredding brushes. The fibers are whole intact and unbroken and remain on the end of the butt end. At the time the fiber-extracted leaf emerges from the last resistance plate 3, it assumes the form as shown in the Fig. 13 where the fibers C are drawn to illustrate an absence of all fleshy pulp and undesirable vegetable matter.

The feed chain proceeds forward toward the cutting shears, and simultaneously the leaf guide 35 picks up the fibers C from the resistance plate 33 and holds them in outstretched horizontal position as the butt ends passing to the shears 63 which clip the cleaned fibers from the butt ends. The fibers drop in small parallel bundles upon the conveyer 70, as shown in Fig. 12. The conveyer continuously moves the fibers outwardly, where they are dropped at the end of the conveyer into a receptacle, or the fibers may be conveyed directly to baling machines employed to bale the fibers for the market.

It is pointed out that the drawings, illustrating one practical design of fiber-extracting machine, show a feed-chain mechanism planned for use in connection with a twin fiber-extracting machine; and by this we mean that another shredding and cleaning machine may be placed along side the shredding machine adjacent the chain feed mechanism. The chain-feed mechanism in the drawings has two parallel rows of teeth, each row extending to the edge of the chain. Each row of teeth is designed to grip and hold the butt end of leaves projecting laterally from each side of the chain. In this manner one feed chain may be used for two shredding machines, above referred to as a twin shredding machine. It is not necessary to construct a feed-chain mechanism for each shredding machine, but, on the other hand, the plans of our invention contemplate, and in fact it comprises, an important feature to make one feed chain convey leaves through two shredding machines. This feature appears defined in the appended claims.

Our fiber-extracting machine embodies principles of construction and modes of operation which renders practical the extraction of fiber from vegetable matter on a large scale, and since there is practically an inexhaustible supply of vegetable life which may be used for this purpose, our invention, on the whole, is presented to greatly augment the industry.

Having thus described our invention, what we desire to secure by Letters Patent is:

1. A machine of the character specified, comprising alined shredding members adapted to be reversely driven, means for positively advancing the article through the machine and from one to the other of the shredding members, independent directing means to insure proper delivery of the article to the shredded members, and means for holding the article in contact with the shredding members, the parts being disposed to operate upon one side of the article then upon the opposite side thereof in succession.

2. In a machine of the character specified, reversely driven alined shredding members, a feeder at one side of the shredding members adapted to grip the butts of the articles and move the latter through the machine and from one to the other of the shredding members, and cutting means disposed adjacent the inner side of the feeder to sever the shredded body of the article from the butt.

3. In a machine of the character specified, a lined rotary shredding members adapted to be reversely driven, a feeder at one side of the shredding members, a cutter adjacent the inner side of the feeder and in the rear of the shredding members, and means between the said cutter and the last shredding member coacting with the feeder to insure proper delivery of the shredded body portion of the article to the cutter for severance from the butt, while the latter is still in the grip of the feeder.

4. In a machine of the character specified, alined rotary shredding members adapted to be reversely driven, a feeder at one side of the shredding members and extending beyond the same, a cutter adjacent the inner side of the rear extension of the feeder, a conveyer overlapping the rear extension of the feeder and extending below the cutter, and means to insure proper delivery of the shredded body of the article to the cutter and conveyer while the butt thereof is still in the grip of the feeder.

5. In a machine of the character specified, a shredder, a carrier for delivering the article to the shredder, a conveyer for delivering the shredded article from the machine, a feeder at one side of the shredder and having its end portion overlapping the feeder and conveyer, a cutter in the rear of the shredder at one side of the rear extension of the feeder and above the receiving end of the conveyer, and independent guide means for effecting proper delivery of the article to the feeder, the shredder, the cutter and the conveyer.

6. In a machine of the character specified, a rotary shredder comprising longitudinal rows of brushes and a helical shredder member encompassing the longitudinal brushes.

7. In a machine of the character specified, a longitudinal feeder, and a shredder at one side of the feeder embodying longitudinally arranged brushes and a helically disposed shredder member encompassing the brushes and acting jointly therewith and with the feeder.

8. An extracting machine for removing the fibers and vegetable threads from plants and leaves, comprising a pair of oppositely driven shredding wheels, a resistance plate made concentric with each shredding wheel, a feed means employed to deliver the leaves to the resistance plates and shredding wheels, and a helical shredder embodied in each shredding wheel to follow and engage the leaf being treated.

9. An extracting machine for removing the fibers and vegetable threads from plants and leaves, comprising a pair of oppositely driven shredding wheels, a resistance plate made concentric with each shredding wheel, a feed means employed to deliver the leaves to the resistance plates and shredding wheels, a helical shredder embodied in each shredding wheel to follow and engage the leaf being treated, and leaf guides to deliver the uncut leaves to the shredding wheels and to receive the extracted fiber from the shredding wheels.

10. An extracting machine for removing the fibers and vegetable threads from plants and leaves, comprising a pair of oppositely driven shredding wheels, a resistance plate made concentric with each shredding wheel, a feed means employed to deliver the leaves to the resistance plates and shredding wheels, a helical shredder embodied in each shredding wheel to follow and engage the leaf being treated, leaf guides to deliver the uncut leaves to the shredding wheels and to receive the extracted fiber from the shredding wheels, and a cutting mechanism arranged adjacent the last-named leaf guide to clip the extracted fibers from the leaf.

11. An extracting machine for removing the fibers and vegetable threads from plants and leaves, comprising a pair of oppositely driven shredding wheels, helical shredders embodied in each shredding wheel and having a forward lead, a resistance plate made concentric with the helical shredders, and a feed-chain mechanism moving in synchronism with the pitch of the helical shredder to hold a leaf in engagement with said shredder.

12. An extracting machine for removing the fibers and vegetable threads from plants and leaves, comprising a pair of oppositely driven shredding wheels, helical shredders embodied in each shredding wheel and having a forward lead, a resistance plate made concentric with the helical shredders, a feed-chain mechanism moving in synchronism with the pitch of the helical shredder to hold a leaf in engagement with said shredder, and a fiber-cutting mechanism to clip the fiber from the feed-chain mechanism.

13. An extracting machine for removing the fibers and vegetable threads from plants and leaves, comprising a pair of oppositely rotated drums, alternate rows of steel brushes and fiber brushes carried on the peripheries of the drums, a helical row of shredding pins carried on the drums and having a lead which screws forward as the drums are rotated, and a leaf-feed mechanism arranged to travel in synchronism with the lead of the aforesaid helical shredder to hold leaves in engagement with the shredder.

14. An extracting machine for removing the fibers and vegetables threads from plants and leaves, comprising a pair of oppositely rotated drums, alternate rows of steel brushes and fiber brushes carried on the peripheries of the drums, a helical row of shredding pins carried on the drums and having a lead which screws forward as the drums are rotated, a leaf-feed mechanism arranged to travel in synchronism with the lead of the aforesaid helical shredder to hold leaves in engagement with the shredder, and means to reciprocally hold the leaves in cutting engagement against the shredder.

15. An extracting machine for removing the fibers and vegetable threads from plants and leaves, comprising a pair of oppositely rotated drums, alternate rows of steel brushes and fiber brushes carried on the peripheries of the drums, a helical row of shredding pins carried on the drums and having a lead which screws forward as the drums are rotated, a leaf-feed mechanism arranged to travel in synchronism with the lead of the aforesaid helical shredder to hold leaves in engagement with the shredder, means to reciprocally hold the leaves in cutting engagement against the shredder, and guides arranged to deliver the leaves in position against the holding means.

16. An extracting machine for removing the fibers and vegetable threads from plants and leaves, comprising a pair of oppositely rotated drums, alternate rows of steel brushes and fiber brushes carried on the peripheries of the drums, a helical row of shredding pins carried on the drums and having a lead which screws forward as the drums are rotated, a leaf-feed mechanism arranged to travel in synchronism with the lead of the aforesaid helical shredder to hold the leaves in engagement with the shredder, and a cutting mechanism arranged to clip the cleaned fibers from the leaf.

17. In a machine of the character specified, reversely rotating shredding members disposed in axial alinement, a resistance plate upon one side of a shredding member, a resistance plate upon the other side of the other shredding member, and a longitudinal feeder at one side of the shredding members adjacent the resistance plates, and opposite and adjacent the receiving edges thereof.

18. In a machine of the character specified, a longitudinal feeder, reversely rotating shredding members at one side of the feeder and in axial alinement, a resistance plate above the feeder and at one side of a shredding member, and a resistance plate below the feeder and at the opposite side of the other shredding member.

19. An extracting machine for removing the fibers and vegetable threads from plants and leaves, comprising a pair of arcuate resistance plates arranged in opposed relation by having one plate fixed in an uppermost position and the other plate fixed in a lowermost position, a feed mechanism adapted to move along the adjacent sides of the two aforesaid resistance plates to hold the leaves against the uppermost plate and to hold the leaves against the lowermost plate, and a shredding wheel concentric with each arcuate plate to shred and sweep the two sides of the leaves being shredded in order to extract the fibers therefrom.

20. An extracting machine for removing the fibers and vegetable threads from plants and leaves, comprising a pair of arcuate resistance plates arranged in opposed relation by having one plate fixed in an uppermost position and the other plate fixed in a lowermost position, a feed mechanism adapted to move along the adjacent sides of the two aforesaid resistance plates to hold the leaves against the uppermost plate and to hold the leaves against the lowermost plate, a shredding wheel concentric with each arcuate plate to shred and sweep the two sides of the leaves being shredded in order to extract the fibers therefrom, a guide arranged to bend the leaves upwardly against one resistance plate, and a guide arranged to pick up the extracted fibers and guide them from the machine.

21. An extracting machine for removing the fibers and vegetable threads from plants and leaves, comprising a pair of arcuate resistance plates arranged in opposed relation by having one plate fixed in an uppermost position and the other plate fixed in a lowermost position, a feed mechanism adapted to move along the adjacent sides of the two aforesaid resistance plates to hold the leaves against the uppermost plate and to hold the leaves against the lowermost plate, a shredding wheel concentric with each arcuate plate to shred and sweep the two sides of the leaves being shredded in order to extract the fibers therefrom, a guide arranged to bend the leaves upwardly against one resistance plate, a guide arranged to pick up the extracted fibers and guide them from the machine, and shears employed to cut the fibers picked up by the last-named guide.

22. An extracting machine for removing the fibers and vegetable threads from plants and leaves, comprising a pair of arcuate resistance plates arranged in opposed relation where one plate is mounted in an uppermost position and the other plate is arranged in lowermost position, a feed mechanism to hold leaves and arranged to travel along the lower edge of the uppermost plate and the upper edge of the lowermost plate, and a helical shredder comprising rows of pins formed on a spiral rotating concentrically with each resistance plate to engage and shred leaves held by the feed mechanism.

23. An extracting machine for removing the fibers and vegetable threads from plants and leaves, comprising a pair of arcuate resistance plates arranged in opposed relation where one plate is mounted in an uppermost position and the other plate is arranged in lowermost position, a feed mechanism to hold leaves and arranged to travel along the lower edge of the uppermost plate and the upper edge of the lowermost plate, a helical shredder comprising rows of pins formed on a spiral rotating concentrically with each resistance plate to engage and shred leaves held by the feed mechanism, and each aforesaid helical shredder rotated to advance in synchronious movement with the leaves carried by the mechanism.

24. An extracting machine for removing the fibers and vegetable threads from plants and leaves, comprising a pair of oppositely related arcuate resistance plates, a shredding drum concentric with each resistance plate and the drums revolved in opposite directions, brushes mounted on the drums, a row of cutting and shredding pins formed on the drums in the shape of a helix having a predetermined lead, and a feed mechanism arranged to deliver leaves to one resistance plate exposing one side of the leaf to the shredding drum, the aforesaid feed mechanism further adapted to deliver the leaves to the other resistance plate exposing the opposite side of the leaves to the shredding drum.

25. An extracting machine for removing the fibers and vegetable threads from plants and leaves, comprising a pair of oppositely related arcuate resistance plates, a shredding drum concentric with each resistance plate and the drums revolved in opposite directions, brushes mounted on the drums, a row of cutting and shredding pins formed on the drums in the shape of a helix having a predetermined lead, a feed mechanism arranged to deliver leaves to one resistance plate exposing one side of the leaf to the shredding drum, the aforesaid feed mechanism further adapted to deliver the leaves to the other resistance plate exposing the opposite side of the leaves to the shredding drum, and a guide to bend the leaves into close contact with the resistance plate as the feed mechanism carries the leaves toward the shredding drums, and a guide arranged to pick up the extracted fiber and divert it from the shredding drum as the feed mechanism carries the extracted fiber from the machine.

26. An extracting machine for removing the fibers and vegetable threads from plants and leaves, comprising a pair of oppositely related arcuate resistance plates, a shredding drum concentric with each resistance plate and the drums revolved in opposite directions, brushes mounted on the drums, a row of cutting and shredding pins formed on the drums in the shape of a helix having a predetermined lead, a feed mechanism arranged to deliver leaves to one resistance plate exposing one side of the leaf to the shredding drum, the aforesaid feed mechanism further adapted to deliver the leaves to the other resistance plate exposing the opposite side of the leaves to the shredding drum, a guide to bend the leaves into close contact with the resistance plate as the feed mechanism carries the leaves toward the shredding drum, a guide arranged to pick up the extracted fiber and divert it from the shredding drum as the feed mechanism carries the extracted fiber from the machine, and shears arranged to clip the extracted fibers from the feed mechanism.

WILLIAM OREN LAMBERT.
GEORGE HERBERT POUND.